April 27, 1954     J. S. JOHNSON ET AL     2,677,067

SPACER FOR BRACING END WINDINGS OF ELECTRICAL MACHINES

Filed July 2, 1952

INVENTORS
Marvin M. Fromm and
John S. Johnson
BY
Frederick Stapor
ATTORNEY

WITNESSES:
John E. Healy
Wm. B. Sellers.

Patented Apr. 27, 1954

2,677,067

UNITED STATES PATENT OFFICE 2,677,067

SPACER FOR BRACING END WINDINGS OF ELECTRICAL MACHINES

John S. Johnson, Export, and Marvin M. Fromm, Greensburg, Pa., assignors to Westinghouse Electric Corporation, East Pittsburgh, Pa., a corporation of Pennsylvania Application July 2, 1952, Serial No. 296,912

10 Claims. (Cl. 310—260)

This invention relates to bracing means for the end windings of electrical apparatus.

In the construction of electrical machines, coils are disposed in slots of magnetic cores of such machines, and the end windings of such coils project beyond the magnetic core. In order to prevent vibration and deformation of the end windings or damage to the insulation thereon, either by accident or due to high amperage electrical current surges, which would bring the end windings into contact and thereby increase the possibility of electrical flashover and failure between the end windings, it is the practice in the industry to interpose bracing members in the spaces between adjacent end windings.

At the present time, machined blocks of wood, phenolic laminates or other insulating members are employed as spacing and bracing members for end windings. Owing to the unavoidable differences in size and shape of the end windings and slight divergencies in projecting from the ends of the slot of the magnetic core, there are substantial differences in the width of the spaces between the various end windings along any peripheral plane. While the end windings may be bent by hand in the case of small electrical machines, it is progressively more difficult to manually deform or bend the end windings to produce precisely the same space between each successive pair of end windings. Damage to the insulation may occur if considerable bending takes place. Therefore, in machines of 10,000 kva. and larger, it is the practice to employ bracing blocks or the like that are individually formed or selected and hand-fitted to each space between adjacent end windings. Furthermore, the blocks must be individually tied with cord or twine in order to prevent loosening and dropping out due to vibration and service stresses. In large dynamoelectric machines, there may be several thousand spacer blocks in a single machine. The hand labor of fitting and tying such a larger number of spacer blocks becomes an important element in the cost of the machine.

In high-voltage electrical machines, the end windings have potential gradients along the surfaces. Spacer blocks between two end windings must have an intimate contact with the insulation of the end winding in order to reduce the stress concentration and to permit effective corona prevention treatment. Therefore, it is desirable that the spacer means be disposed in as intimate and tight-fitting a contact with the end windings as is reasonably possible. This has not been entirely successful using the wood or phenolic resin laminate spacing means and twine or cord ties to maintain them in place.

The object of this invention is to provide bracing means for end windings of electrical machines by forcing into the spaces between successive end windings a pliable member saturated with a hardenable resin so that the member conforms intimately and closely to the surfaces of the end windings, and upon hardening of the resin, there results a bracing member capable of meeting all requirements.

Another object of the invention is to provide a bracing member comprising a length of a rope-like bundle of pliable fibrous material having enlarged rigid ends treated with a hardened resin whereby the pliable center portion may be positioned in tight and intimate contact with the sides of adjacent end windings.

A still further object of the invention is to provide a process for producing bracing members of selected length from a long rope-like member comprising a braided jacket and a pliable fibrous filling within the jacket by impregnating a short portion of the long member at intervals corresponding to the desired length of the spacer member, curing the applied resin to produce a hard rigid portion at such spaced intervals, and then severing the rope-like length of material at said hardened intervals to produce the desired length of spacer member.

Other objects of the invention will in part be obvious and will in part appear hereinafter. For a better understanding of the nature and objects of the invention, reference should be had to the following detailed description and drawing in which.

In accordance with the present invention, we have produced a novel spacer member comprising rigid enlarged ends greater than the space between adjacent end windings to which the member is to be applied and a center portion which is pliable and flexible whereby the member may be forced into the space between adjacent end windings whereupon the center portion will fit into intimate and close contact with the walls of the end windings. The flexible center portion is treated with a hardenable resinous composition so that after the member has been forced between the end windings the resinous composition will harden and the spacer will then be relatively immovable and will resist compressive forces between the end windings to which it is applied. The enlarged portions prevent the spacer from falling out or otherwise being displaced. Therefore, the previous need for applying ties of twine or cord are eliminated.

The spacer members of the present invention are preferably prepared from a long piece of a fibrous rope-like member having a diameter larger than the particular spaces between the end windings of the machine to which the spacers are to be applied. Braided asbestos or other relatively flexible rope-like members from various fibrous materials are available and may be employed. The member may comprise bundles of fibrous material loosely twisted or wrapped at intervals.

We have secured particularly good results from rope-like members comprising a flexible braided jacket of glass fibers with a filling of loose glass fibers disposed within the jacket. The rope-like member should be flexible and compressible within limits to a flattened state a half or a third of its diameter. It should be understood that the jacket may be prepared from any fibrous material, such, for example, as asbestos or a resinous fiber having good strength and a high melting or softening point. Thus, fibers of acrylonitrile polymers or polyethylene glycol-terephthalate may be employed for the braided jacket. It will be understood that the jacket may be knitted or woven. The fibrous filling within the jacket may comprise either inorganic fibrous materials, such as asbestos or glass fibers, or synthetic resinous fibrous materials, such as those mentioned above for the jacket, or mixture of any two or more. It is desirable that the rope-like member be reasonably flexible and pliable so that it can be forced into a space and will readily compress and conform to the walls forming the space. The fibrous material also should be such as to be readily impregnated or saturated with hardenable liquid resinous compositions.

Figure 1:
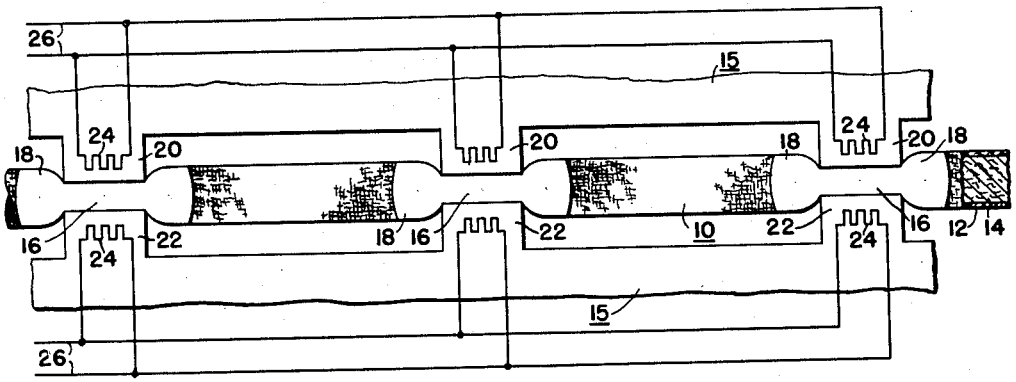
Figure 1 is a fragmentary view in elevation of a device for producing the spacer members of this invention.

Referring to Fig. 1 of the drawing, there is illustrated a device for making suitable short lengths of spacer member from a rope-like member of considerable length as described herein. The rope-like member 10 comprises a jacket 12 of braided, knitted or woven fibrous material and the filling 14 of fibrous material. At spaced intervals corresponding substantially to the desired lengths of the individual spacer members, the member 10 is saturated for a lineal distance of the order of an inch with a hardenable liquid resinous composition. The fibrous filling will retain the resinous composition at said portions. The portion of the member between such saturated intervals comprises substantially unimpregnated fibrous material. The member 10 is then subjected to heat treatment in order to cure the resinous composition applied at spaced intervals to a hardened state. Such curing may be accomplished by placing the member within an oven or otherwise heating it. With some resinous compositions, the rope-like member need only be permitted to remain at room temperature for a period of time of four to twenty-four hours, and substantially complete curing of the applied resin will take place.

However, requirements of production ordinarily necessitate more rapid curing of the resinous composition. Therefore, the rope-like member 10 with the applied resinous composition is treated as illustrated in Fig. 1 by being placed in a press generally designated as 15, having movable, meeting pairs of jaws 20 and 22 disposed at intervals corresponding to the desired length of the individual spacer members. The saturated portions of the rope-like member are disposed in alignment with the pairs of jaws 20 and 22, and then the jaws are brought together under suitable pressure to produce flattened portions 16. On either side of such flattened portions, there are present portions 18 saturated with the resinous composition and attaining substantially the same diameter as the normal diameter of the member 10. Each of the jaws 20 and 22 is provided with a suitable electrical heating element 24 in circuit with a source of electrical current 26. Electrical current from the source 26 causes the heating elements to generate heat, whereby the jaws 20 and 22 are heated and rapidly impart such heat to the portions 16 to bring them to a temperature sufficient to cure the applied resinous composition in the portions 16 and 18 within a few minutes or a fraction of an hour. It will be understood that steam or other heating means may be applied to the jaws 20 and 22. As will be disclosed hereinafter, temperatures of the order of from 100° C. to 200° C. are ordinarily sufficient to cure most hardenable resinous compositions.

Figure 2:
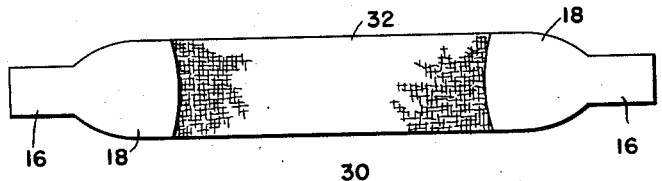
Figure 2 is a view in elevation of a completed spacer member in accordance with the invention.

After the portions 16 and 18 have been cured in the press 15, the press is opened, and the resulting rope-like member with permanently compressed flattened portion 16 wider than the normal diameter of the member 10 is then severed at or about the center of each of the portions 16 into short individual lengths. Such severed lengths, designated as 30, are illustrated in enlarged view in Fig. 2 of the drawing. The lengths 30 comprise the flat end portion 16, the enlarged hardened end portion 18, and a substantial central portion 32 which is flexible and pliable.

It should be understood that the flattened portions 16 are not necessary. By employing semicircular notches in jaws 20 and 22 the member 10 will slightly radially compress and the resin-impregnated portions will be cured while in a rounded shape. Upon severing of the member 10, there would result lengths 30 that would be substantially cylindrical from end to end. The ends will be rigid and hard, while the center portion will be flexible.

While the above description has been specific to rope-like members of circular cross section, it will be understood that the rope-like member 10 may be of square, hexagonal, or any other suitable cross section. For certain large machines, it is contemplated that the rope-like member will comprise a rectangular or even a slightly flattened rectangular or trapezoidal cross section.

Figure 3:
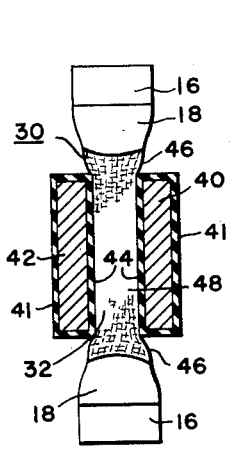
Figure 3 is a fragmentary view comprising a cross section through end windings provided with the spacer members of the present invention.

The lengths 30 may be stored and handled indefinitely. At any time after they have been prepared, the individual lengths may be employed as a spacer or bracing means between adjacent end windings. Referring to Fig. 3 of the drawing, there is illustrated the application of one of the spacer members 30 in a dynamoelectric machine. Adjacent end windings 40 and 42, projecting from the magnetic core of the machine and each end winding having insulation 41, are separated by a space 44 in which it is desirable to place a bracing length 30. The space 44 is smaller than the nominal diameter or thickness of the center portion 32 of the length 30. The length 30 is first introduced into space 44 with the flattened portions 16 disposed parallel to the sides of the conductors 40—42, then the lengths 30 are turned 90° so that the portions 16 are perpendicular to the sides of portions 16 as shown in Figure 3. This ensures that the lengths 30 do not fall out. Since there is usually a slight divergence of the conductors 40—42 as they extend away from the core, the lengths 30 are usually introduced a short distance further out than the exact location at which the lengths 30 are to be permanently fixed. The length 30 is then forced or driven into the space 44, for example, by means of a wooden tamp bar, whereby the flexible and pliable portion 32 is flattened and conforms intimately and closely to the insulation 41 forming the sides of the end windings 40 and 42 at the space 44. The flattened portions 16 and enlarged portions 18 at each end of the length 30 are larger than the width of the space 44 so that the length 30 will not fall or slide out regardless of what happens thereafter.

The lengths 30 are preferably impregnated or saturated with a hardenable liquid resinous composition just preceding the time when they are forced into the space 44. After having forced the length 30 into the space, the liquid resinous composition will saturate and fill all of the interstices in the fibrous material forming the central portion 32. Thereafter, the liquid resinous composition present in the portion 32 is cured or hardened. After hardening, it will be found that the length 30 will comprise a hardened bulge 46 just outside of the top and bottom sides of the end windings 40 and 42 and a flattened central portion 48 conforming to and intimately fitting the insulation 41 at the inside portions of each of the end windings at the space 44. Due to the hardening of the resin after the lengths 30 have been forced in, the portion 48 will be locked into place and will be substantially immovable except by the exertion of considerable force, which will not be met with in service. We have found that the hardened central portion 48 will withstand any compressive forces that may be reasonably expected between the end windings 40 and 42 in service. Our tests have indicated that the portion 48 when prepared from glass fibers and polyester-type resins, as will be detailed herein, will withstand compressive stresses of the order of from 15,000 to 20,000 p. s. i. This is more than adequate to meet any stress in service.

Figure 4:
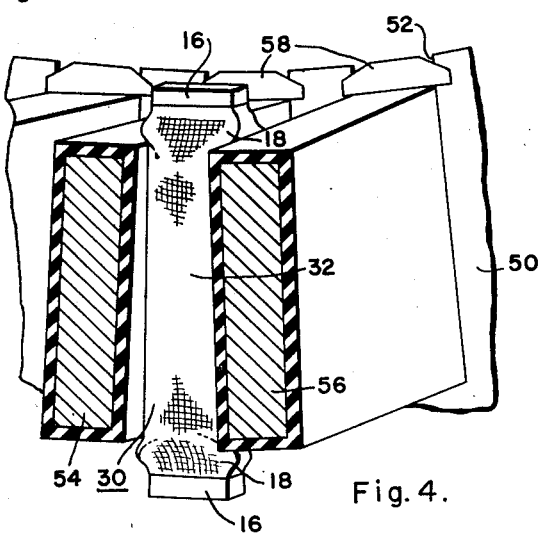
Figure 4 is a fragmentary perspective view partly in cross section.

Referring to Fig. 4 of the drawing, there is shown the application of the lengths 30 between coils in a dynamoelectric machine. The machine comprises a magnetic core 50 provided with a plurality of slots 52 within which are disposed coils 54 and 56 with end portions projecting outwardly therefrom. Slot sticks 58 retain the coils 54 and 56 in place in the slots 52. The lengths 30 are disposed in the space between the coils 54 and 56 with their flattened ends 16 transversely located with respect to the coils. The center portion 32 is forced into the space while soft and pliable. Thereafter, a liquid resin in the portion 32 cures to a hard body and the length 30 is firmly anchored.

There are numerous hardenable resinous compositions that may be employed both for treating and preparing end portions 16 and 18 and for treating and preparing the portions 46 and 48 of the lengths of the rope-like member 10. Or-dinarily, thermoplastic resinous compositions are not desirable because they will soften at temperatures that may be expected in service. It is, therefore, preferred to employ thermosettable resinous compositions. Numerous thermosettable resinous compositions are available. Phenolic resinnous compositions, polyepoxides, melamine-aldehyde resins, and silicone resins, for example, may be employed. We have secured exceptionally good results with completely reactive polyester-type resinous compositions that thermoset. These completely reactive compositions may comprise one or more compounds containing two or more unsaturated aliphatic groups. Examples of such compounds are diallyl phthalate, diallyl sebacate, and divinyl benzene. The liquid resinous compositions to be used may comprise two or more compounds having reactive unsaturated >C=C< groups capable of vinyl-type addition polymerization. We have secured particularly good results by employing a solution comprising a liquid monomeric compound having the group $H_2C=C<$, in which is dissolved an unsaturated polyester having the group >C=C<. Particularly good results have been secured by employing as the polyester resin the reaction product of an ethylenic dicarboxylic acid or anhydride thereof such, for example, as maleic acid, fumaric acid, maleic anhydride, monochlormaleic acid, itaconic acid, itaconic anhydride, citraconic acid and citraconic anhydride. The unsaturated dicarboxylic acid or anhydrides or mixtures thereof are reacted with a substantially molar equivalent of one or more polyhydric alcohols such as ethylene glycol, glycerol, propylene glycol, diethylene glycol, or pentaerythritol or mixtures thereof. Castor oil has been employed successfully in an esterification reaction with maleic anhydride. The resultant ester, such as castor oil maleate ester, is admixed with a polymerizable unsaturated monomer, for example, monostyrene, in the proportions of from 10 to 95 parts by weight of the monostyrene and from 90 to 5 parts by weight of the ester.

In the preparation of the unsaturated alkyd esters, an ethylenically unsaturated alpha-beta dicarboxylic acid or anhydride may be replaced with up to 95% of the weight thereof by a saturated aliphatic dicarboxylic acid or aryl dicarboxylic acid or anhydride, such, for example, as succinic acid, adipic acid, sebacic acid, phthalic acid, phthalic anhydride or the like. In some instances, epoxides have been employed in lieu of glycols, particularly in reactions with dicarboxylic acids instead of their anhydrides.

The unsaturated alkyd esters are dissolved in a liquid unsaturated monomer having the group $H_2C=C<$. Suitable liquid unsaturated polymerizable monomers are: monostyrene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl cortonate, 1,3-chloroprene, and divinyl benzene, as well as mixtures of two or more of any of these monomers.

An excellent completely reactive composition is one composed of a solution of from 90 to 50 parts of arylalkene polymerizable monomer of from 10 to 50 parts by weight of the alkyd reaction products of (A) an unsaturated acidic compound from the group consisting of maleic acid, maleic anhydride, fumaric acid, citraconic acid, and citraconic anhydride in admixture with one or more saturated straight chain dicarboxylic acids having the carboxyl groups disposed at the end of the straight chain, the chain having from 2 to 10 non-carboxyl carbon atoms and no other reactive groups, and (B) a molar equivalent within ±10% of an aliphatic saturated glycol having no other reactive group than the hydroxyl groups. The proportion of the unsaturated acidic compound in the mixture of acids should be between 5% and 50% of the weight of the mixture. Suitable saturated dicarboxylic acids are adipic acid, sebacic acid, azelaic acid, suberic acid, succinic acid, decamethylene dicarboxylic acid and diglycolic acid and mixtures thereof. With the longer chain saturated dicarboxylic acids, as, for example, sebacic acid, the proportion of maleic anhydride, for example, may be higher than if the saturated acid were all succinic acid, if cured products of similar degrees of hardness are desired. Suitable glycols for reaction with the mixture of saturated and unsaturated acids are ethylene glycol, propylene glycol, diethylene glycol, 1,5-pentanediol and triethylene glycol. Mixtures of the glycols are suitable for producing the reaction product. The reaction of the (A) acidic compounds and (B) the glycols may be carried out by heating in a reaction vessel at temperatures of from 100° C. to 250° C. for from 24 hours to 2 hours to a low acid number of below 60.

The following are specific examples of the preparation of the unsaturated alkyd reaction products to be dissolved in the vinyl aryl monomer:

Example I

A mixture of 44 mole per cent of adipic acid and 6 mole per cent of fumaric acid was combined with 50 mole per cent of propylene glycol and reacted with $CO_2$, sparging for about 4 hours at 140° C. in a closed reaction vessel after which the temperature was raised to 220° C. over a 4-hour period and the reaction was continued at 220° C. for 8 hours. A syrupy polyester resin was produced.

Another composition comprised the reaction product of 10 mole per cent of maleic anhydride, 40 mole per cent of adipic acid, and 50 mole per cent of diethylene glycol.

Example II

A reaction product was prepared by reacting 30 mole per cent of sebacic acid, 20 mole per cent of maleic anhydride, and 50 mole per cent of diethylene glycol under the same conditions as in Example I with a syrupy resin of low acid number resulting.

The unsaturated esters or alkyd resins of these two examples so prepared are dissolved in a monomeric compound having the group $H_2C=C<$, such as monostyrene, or a simple substitution derivative of monostyrene, or a mixture of two or more monomers, as above described, to produce low viscosity, completely reactive solutions having present from 15% to 80% by weight of the unsaturated ester. Particularly good results have been obtained by dissolving the unsaturated esters in monostyrene to produce solutions containing from about 20% to 85% by weight of monostyrene and the balance, 80% to 15% by weight, composed of the unsaturated esters.

The above solutions are solvent reactive compositions that will polymerize completely when admixed with one or more vinyl-type polymerization catalysts, such as benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts, in an amount of from 0.5% to 5% and more, by weight. The proportion of the catalyst obviously may be present in amounts differing from these percentages.

In order to promote room temperature polymerization, we have found it necessary that there be included along with the catalyst a small amount of an accelerator for example 0.01% to 2% of the weight of the composition. Suitable accelerators are nitrogen-carbon-hydrogen compounds selected from the group consisting of azomethine compounds, polyamino compounds, having at least one terminal primary amino group, and the aldehyde reaction products of such compounds. Reaction products of a primary aliphatic or aryl amine with an aldehyde in substantially stoichiometric proportions will produce the azomethine compounds. Thus benzaldehyde, butyraldehyde or furfural can be reacted in equimolar proportions with aniline, toluidine or ethylene diamine. The following are examples of suitable aliphatic polyamines within the scope of this invention: ethylenediamine, N - (β-hydroxyethyl) -ethylenediamine, 1,2-propylenediamine, diethylenetriamine, triethylenetetramine, $N^1,N^4$ - dibutylidene-triethylenetetramine, N-monosalicylidene-diethylenetriamine, N,N' - disalicylidene - ethylenediamine, $N^1,N^3$ - disalicylidene-diethylenetriamine, $N^1,N^4$-disalicylidene - triethylenetetramine, and the monosalicylidene and disalicylidene derivatives of the mixture of polyethylene polyamines obtained by condensing ethylene chloride with ammonia.

Aldehydes which may be reacted with aliphatic polyamines to produce promoters useful in this invention include aliphatic aldehydes such as formaldehyde, acetaldehyde, propionaldehyde, and butyraldehyde; unsaturated aldehydes such as crotonaldehyde and furfural; and aromatic aldehydes such as benzaldehyde, salicyaldehyde, and cinnamaldehyde. The amount of accelerator compound may be varied from 0.01% to 2% based on the weight of the resinous composition. The following example illustrates the preparation of a composition in accordance with the invention:

Example III

A polyester prepared by reacting diethylene glycol with a molar equivalent of maleic anhydride to an acid number of 50 was admixed with monostyrene in the ratio of 70 parts of the unsaturated polyester and 30 parts of monostyrene. To each 100 parts of the resulting solution there was added 2 parts of benzoyl peroxide, and 0.1 part of propylene diamine per 100 parts of solution were admixed. The composition containing the propylene diamine began to gel in about one hour. Ordinarily we prefer that the gel time be controlled to take place in approximately 1 to 3 hours. For this purpose, from 0.01 to 0.1 part of propylene diamine is sufficient.

Other accelerators or catalyzing promoters are metallic salts commonly employed as driers in the varnish industry. Examples thereof are a cobalt and lead naphthenates, oleates, linoleates, resinates, octoates and other salts of organic acids. Tin chloride may be added to promote room temperature gelations of the resins.

The following example illustrates this feature of the invention:

Example IV

The resin composition of Example II was dissolved in monostyrene to produce a solution composed of 35% by weight monostyrene and 65% of the polyester reaction product. Each 100 parts of the resulting solution by weight was admixed with three parts by weight of tertiary butyl hydroperoxide, 0.05 part by weight of cobalt naphthenate and 0.05 part of stannous chloride. The composition would gel in approximately one to two hours at 25° C.

Example V

A considerable length of a rope-like member of approximately ¾ inch in diameter, comprising a braided jacket of glass fibers and a filling of loose glass fibers, was treated at intervals of five inches to saturate a portion of approximately 1½ inches long with the resinous composition of Example III. The length of member was then placed in a press having pairs of heated jaws five inches apart having flat faces extending one inch along the rope member. A temperature of 150° C. was produced in each of the jaws while they were clamped at the member to compress it to a flat portion approximately 1/16 inch thick. Within ten minutes, the applied polyester composition was hardened to a substantially thermoset state. Thereafter, the long length of member was severed at substantially the central portion of the flattened area in a cutting press, thereby producing spacer members approximately five inches long. Approximately 3 inches of the central portion of each of the lengths was soft and flexible. Thereafter, a number of the members 30 were immersed in a solution corresponding to that of Example III. The members, after having been immersed in the solution for fifteen minutes, were withdrawn, drained and one by one were inserted with the ends flatwise to the spaces, then turned 90° and forced between the end windings of a machine. In this case, the end windings were approximately 3 inches high, and the spaces between the end windings were approximately ½ inch. Each of the saturated members was tamped into place with one or two blows of a wooden tamp bar. Within a short period of time, several hundred of the spacer members had been placed between the end windings of a dynamoelectric machine. The normal fitting and tying procedures employed would have required over twenty times the labor required to apply the spacer members of the present invention. Within eight hours after the lengths 30 of the spacer member had been applied to the machine, the resin at the central portion had thermoset, and the machine was ready for further operations to put it in condition for service.

It should be understood that two or more spacers may be fitted in the same space either in a position adjacent to one another or at intervals of several inches between the spacer members. The spacer members need not be of the same dimension. Ordinarily, the end windings diverge slightly from the slot portions of the magnetic core so that, for example, in large generators a ½ inch diameter member may be employed to brace the end winding within a few inches from the core, a ⅝ inch diameter member may be employed at a distance of approximately a foot from the core, and a ¾ inch or larger member may be employed at a still greater distance from the magnetic core.

The spacer members of the present invention have been found to have an intimate and close contact with the insulation at the surfaces of the end windings, whereby voltage stress concentrations are reduced, and corona prevention treatment may be applied and will not be rendered ineffective because of loose spacer members. Also, the elimination of twine and other tie members has resulted in a better reduction of corona activity in end windings produced in accordance with the present invention.

It will be appreciated that the lengths of spacer member may be impregnated with other resinous compositions than those disclosed herein, which resinous compositions require curing under elevated temperatures; for example, phenolic resins may be employed for saturating the central portion 32 of the spacer members, and after they have been forced between the end windings, the entire electrical machine may be placed in an oven and heated to a temperature at which the applied phenolic resin will cure. However, in large machines of 10,000 kva. and higher capacity, it is not only time-consuming but difficult to heat or make the machine. Therefore, it is preferred to employ resins having an unsaturated or olefinic group and catalysts that will cause curing thereof at room temperature. Also, infra-red lamps with focusing reflectors may be employed to cure the resins present in the spacers.

Since certain changes in carrying out the above process, and certain modifications in the article which embody the invention may be made without departing from its scope, it is intended that all matter contained in the above description or shown in the drawing shall be interpreted as illustrative and not in a limiting sense.

We claim as our invention:

1. In an electrical machine having a plurality of coils disposed in slots in a magnetic core, the coils having spaced end windings projecting beyond the magnetic core, in combination, bracing means in the spaces between adjacent spaced end windings, said bracing means comprising individual lengths of a rope-like member disposed in each of the spaces between the end windings so braced, each of the lengths extending slightly beyond the sides of the end windings, each length of the rope-like member having both ends impregnated with a hardened resin to provide a hard, rigid enlarged, flattened end portion greater than the width of the space in which the length is disposed so that the length will not fall out, the center portion of each length being of a shape to fit tightly against and in intimate contact with the sides of the end windings to which it is applied, said shape being such as results from forcing the center portion of the length while in a pliable state into the space, and a hardened resin impregnating the center portion to render it hard and rigid whereby the length is held in place and braces the adjacent end windings against which it fits against compressive movement.

2. In an electrical machine having a plurality of coils disposed in slots in a magnetic core, the coils having spaced end windings projecting beyond the magnetic core, in combination, bracing means in the spaces between adjacent spaced end windings, said bracing means comprising individual lengths of a rope-like member disposed in each of the spaces between the end windings so braced, the individual short lengths comprising a pliable fibrous material disposed with a flexible braided fibrous jacket of a diameter normally greater than the width of the space to be filled, the lengths extending slightly beyond the sides of the end windings, each length of the rope-like member having both ends impregnated with a hardened resin to provide a hard, rigid enlarged, flattened end portion greater than the width of the space in which the length is disposed so that the length will not fall out of the space, the center portion of each length being of a shape to fit tightly against and in intimate contact with the sides of the end windings to which it is applied, said shape being such as results from forcing the center portion of the length while in a pliable state into the space, and a hardened resin impregnating the center portion to render it hard and rigid whereby the length is held in place and braces the adjacent end windings against which it fits against compressive movement.

3. The electrical machine of claim 2 wherein the fibrous material and the fibrous jacket of the lengths are composed of glass fibers.

4. The electrical machine of claim 2 wherein the hardened resin applied to the short lengths is a thermoset resin comprising a polymer of a compound having the reactive group $>C=C<$.

5. A bracing member comprising a length of a rope-like member having an exterior jacket of a braided fibrous material and a body of pliable fibrous material disposed within the jacket, the ends of the member being impregnated with a hardened resinous composition to render the ends hard and rigid and the center portion being pliable and flexible.

6. The bracing member of claim 5 wherein the jacket and the body of pliable fibrous material comprise essentially glass fibers.

7. The bracing member of claim 5 wherein the hardened resinous composition comprises a polymer of a compound having the reactive group $>C=C<$.

8. In the process of bracing the spaced end windings of coils of an electrical machine, the steps comprising impregnating with a liquid thermosettable resinous composition a length of a rope-like member having an exterior jacket of a braided fibrous material and a body of pliable fibrous material disposed within the jacket, the ends of the member being impregnated with a hardened resinous composition to render the ends hard and rigid and the center portion being pliable and flexible, the pliable center portion being saturated with the liquid thermosettable resin, forcing the impregnated length of member into the space between adjacent end windings to be braced apart, the ends of the member impregnated with the hardened resinous composition being larger than the space between the adjacent end windings to prevent lengthwise dislodgement and only the pliable center portion is disposed in said space to fit intimately and tightly against the sides of the adjacent end windings, and hardening the liquid thermosettable resin whereby the applied length becomes hard and rigid, and resists compressive movement of the end windings.

9. In the process of making lengths of spacer members, the steps comprising applying a hardenable liquid resinous composition at points disposed at spaced intervals along a relatively long rope-like member comprising a braided jacket of fibrous material and flexible and pliable filling of fibrous material in the jacket in an amount to saturate said pliable filling at each interval point, said intervals corresponding to the desired length of the spacer members, the portion of the spacer member between said interval points being substantially free of said resinous composition, curing the applied resinous composition to a hardenable state, and severing the length of rope-like material at each point.

10. In the process of making lengths of spacer members, the steps comprising applying a hardenable liquid resinous composition at points disposed at spaced intervals along a relatively long rope-like member comprising a braided jacket of fibrous material and flexible and pliable filling of fibrous material in the jacket in an amount to saturate said pliable filling at each interval point, said intervals corresponding to the desired length of the spacer members, the portion of the spacer member between said interval points being substantially free of said resinous composition, during the applied resinous composition by applying pressure and heat at each interval point, a substantial part of the impregnated filling being heated while being pressed in order to maintain its normal shape, and severing the length of rope-like material at each point.

References Cited in the file of this patent

UNITED STATES PATENTS

| Number | Name | Date |
|---|---|---|
| 2,602,829 | Fromm et al. | July 8, 1952 |

FOREIGN PATENTS

| Number | Country | Date |
|---|---|---|
| 618,844 | France | Dec. 21, 1926 |